US012572370B2

(12) United States Patent
Yang et al.

(10) Patent No.: US 12,572,370 B2
(45) Date of Patent: Mar. 10, 2026

(54) APPLICATION PLATFORM AND APPLICATION MANAGEMENT METHOD

(71) Applicant: Hangzhou Jindoutengyun Technologies Co., Ltd., Hangzhou (CN)

(72) Inventors: Yang Yang, Hangzhou (CN); Jie Ding, Hangzhou (CN)

(73) Assignee: Hangzhou Jindoutengyun Technologies Co., Ltd., Hangzhou (CN)

( * ) Notice: Subject to any disclaimer, the term of this patent is extended or adjusted under 35 U.S.C. 154(b) by 0 days.

(21) Appl. No.: 18/487,147

(22) Filed: Oct. 16, 2023

(65) Prior Publication Data

US 2024/0036886 A1     Feb. 1, 2024

Related U.S. Application Data

(63) Continuation-in-part of application No. 17/814,841, filed on Jul. 26, 2022, now Pat. No. 11,836,509.

(30) Foreign Application Priority Data

Jul. 27, 2021     (CN) ......................... 202110851848.5

(51) Int. Cl.
    *G06F 9/445*        (2018.01)
    *G06F 9/451*        (2018.01)
(52) U.S. Cl.
    CPC .......... *G06F 9/44505* (2013.01); *G06F 9/451* (2018.02)

(58) Field of Classification Search
    None
    See application file for complete search history.

(56)                References Cited

U.S. PATENT DOCUMENTS

2010/0064299 A1*  3/2010  Kacin ...................... G06F 9/54
                                                    719/328
2013/0212485 A1*  8/2013  Yankovich ............ G06F 9/4451
                                                    719/329
2014/0229951 A1*  8/2014  Zhang ..................... G06F 9/445
                                                    718/100
2019/0251278 A1*  8/2019  Kalinichenko ....... H04L 9/0825
2019/0253523 A1*  8/2019  Raduchel .............. H04L 67/306
2022/0027778 A1*  1/2022  Kochura ............. G06F 11/3447

* cited by examiner

*Primary Examiner* — Chat C Do
*Assistant Examiner* — William C Wood

(57)                ABSTRACT

An application platform comprises: a user interface used for realizing interaction with users; an application container connector used for accessing an application container instance according to an interactive operation performed by the users through the user interface; at least one application container instance comprising an application, an application connector interface connected to the application container connector, a user data interface connected to a user data set, and a base system environment and dependency for running the application, wherein after being started, the application container instance receives an access from the application container connector through the application connector interface and accesses user data corresponding to the application through the user data interface; and the user data set used for storing user data to be accessed by the application container instance. All applications are mutually independent, and in presence of a malicious application, other applications can run normally without being affected.

11 Claims, 5 Drawing Sheets

APPLICATION PLATFORM AND APPLICATION MANAGEMENT METHOD

BACKGROUND OF THE INVENTION

1. Technical Field

The invention relates to an application platform and an application management method.

2. Description of Related Art

As shown in FIG. 1, in an existing system, multiple applications run based on a common base system environment and dependency. Under such as system architecture, if one application is attacked due to bugs, the base system environment and dependency will be exposed to the risk of an attack, and other applications will be attacked, thus leading to destruction of the whole system.

BRIEF SUMMARY OF THE INVENTION

The objective of the invention is to solve the above-mentioned problems by providing an application platform, which keep all applications independent of each other, thus guaranteeing normal running of other applications in presence of a malicious application. The application platform may be part of a system.

The invention further provides an application management method.

To fulfill the above objective, the invention is implemented through the following technical solutions:

In one aspect of the invention, an application platform comprises:

A user interface used for realizing interaction with users;

An application container connector used for accessing an application container instance according to an interactive operation performed by the users through the user interface;

At least one application container instance comprising an application, an application connector interface connected to the application container connector, a user data interface connected to a user data set, and a base system environment and dependency for running the application, wherein after being started, the application container instance receives an access from the application container connector through the application connector interface and accesses user data corresponding to the application through the user data interface; the application container instance refers to an entity unit for carrying the application and the base system environment and dependency for running the application, and may be a container formed based on a Linux namespaces isolation technique represented by Docker, or an individual physical host or virtual machine; and The user data set used for storing user data to be accessed by the application container instance.

Preferably,

The application container connector is also used for feeding contents, presented by the application container instance, back to the user interface;

The application container instance is used for feeding the presented contents back to the application container connector.

Preferably,

The application container connector is also used for transmitting the interactive operation performed by the users through the user interface to the application container instance;

The application container instance is also used for applying the interactive operation transmitted from the application container connector to the application.

Preferably, the application platform further comprises:

An application container template library storing at least one application container template; and An application container manager used for receiving a request from the application container connector and establishing an application container instance using a corresponding application container template.

Preferably, establishing an application container instance using a corresponding application container template specifically comprises:

Selecting the corresponding application container template from the application container template library by the application container manager according to the request from the application container connector, generating a corresponding application container instance according to the selected application container template, and starting and configuring the application container instance.

Preferably, the application container manager is also used for deleting an application container instance.

Preferably,

The application container connector is also used for requesting the application container manager to start a corresponding application container instance according to the interactive operation performed by the users through the user interface, and accessing the application container instance after the corresponding application container instance is accessible.

Preferably, the user data set stores multiple pieces of mutually independent user data that is to be accessed merely by corresponding application container instances.

Preferably, the application container instance is established by the application container manager according to the request from the application container connector.

As mentioned above, the application platform may be part of a system. The system may further comprise an entity unit comprising a further memory storing instructions, and at least one further hardware processor to execute the instructions to: start the application container instance, which comprises an application, an application connector interface connected to the application container connector, a user data interface connected to a user data set, and a base system environment and dependency for running the application, wherein after being started, the application container instance receives an access from the application container connector through the application connector interface and access user data corresponding to the application through the user data interface; and store user data using the user data set to be accessed by the application container instance.

In another aspect of the invention, an application platform comprises:

A user interface used for realizing interaction with users;

An application container connector used for requesting an application container manager to start a corresponding application container instance according to an interactive operation performed by the users through the user interface, and accessing the application container instance after the corresponding application container instance is accessible;

The application container manager used for receiving a request from the application container connector and establishing an application container instance using a corresponding application container template; and A user data set used for storing user data to be accessed by the application container instance;

Wherein, the application container instance comprises an application, an application connector interface connected to the application container connector, a user data interface connected to the user data set, and a base system environment and dependency for running the application; and after being started, the application container instance receives an access from the application container connector through the application connector interface and accesses user data corresponding to the application through the user data interface.

Preferably,

The application container connector is also used for feeding contents, presented by the application container instance, back to the user interface;

The application container instance is used for feeding the presented contents back to the application container connector.

Preferably,

The application container connector is also used for transmitting the interactive operation performed by the users through the user interface to the application container instance;

The application container instance is also used for applying the interactive operation transmitted from the application container connector to the application.

Preferably, establishing an application container instance using a corresponding application container template specifically comprises:

Selecting the corresponding application container template from an application container template library by the application container manager according to the request from the application container connector, generating the corresponding application container instance according to the selected application container template, and starting and configuring the application container instance.

Preferably, the application container manager is also used for deleting an application container instance.

Preferably, the user data set stores multiple pieces of mutually independent user data that is to be accessed merely by corresponding application container instances.

As mentioned above, the application platform may be part of a system. The system further comprise an entity unit comprising a further memory storing instructions, and at least one further hardware processor to execute the instructions to start the application container instance, wherein, the application container instance comprises an application, an application connector interface connected to the application container connector, a user data interface connected to a user data set, and a base system environment and dependency for running the application; and after being started, the application container instance receives an access from the application container connector through the application connector interface and accesses user data corresponding to the application through the user data interface; and store user data using the user data set to be accessed by the application container instance.

In another aspect of the invention, an application management method applied to an application container manager comprises:

Receiving a request for starting an application container instance from an application container connector; and Establishing an application container instance using a corresponding application container template;

The application container instance comprising:

An application;

An application connector interface connected to the application container connector to feed contents, presented by the application, back to a user interface through the application container connector;

A user data interface connected to a user data set to allow the application to access corresponding user data corresponding to the application; and A base system environment and dependency for running the application.

Preferably, establishing an application container instance using a corresponding application container template specifically comprises:

Selecting the corresponding application container template from an application container template library by the application container manager according to the request from the application container connector, generating the corresponding application container instance according to the selected application container template, and starting and configuring the application container instance.

Preferably, the application container manager is also used for deleting an application container instance.

The invention has the following beneficial effects:

1. Each application container instance in the application platform of the invention packages an application and an exclusive base system environment and dependency for running the application, so that all applications are mutually independent, the situation where multiple applications share one base system environment and dependency in the prior art is avoided; after being started, the application container instances run separately based on respective exclusive basic system environments and dependencies, so even if one application container instance is attacked, only the attacked application container instance will be destroyed, and other application container instances can run normally without being affected.

2. User data is mutually independent and can be accessed merely by corresponding application container instances, that is, different application container instances can only process corresponding user data, so even if user data corresponding to one application container instance is destroyed, user data corresponding to other application container instances will not be affected, and user data is better protected.

3. Application container instances are temporarily established by the application container manager according to requests before being used by users, that is, the application container instances are dynamically generated according to requests, so that resource consumption is reduced.

4. The application container manager deletes a corresponding application container instance according to a received application container instance removal request (for example, users perform an operation through the user interface, and then, the application container connector sends an application container instance removal request to the application container manager according to the operation; or, an application platform administrator sends an application container instance removal request to the application container manager when monitoring that one application container instance has not been operated for a long time), that is, the corresponding application container instance will be destroyed after being used by users, so application residue is avoided, and self-restoration is realized, for example, if an application container instance is destroyed by an attack, the application container manager will delete this application container instance according to an application container instance removal request, and a new application container instance will be established at next startup.

5. After being started, application container instances run separately based on respective exclusive basic system environments and dependencies, so that the possibility of an application conflict caused by multiple applications sharing one base system environment and dependency in the prior art is avoided.

6. Application container instances run based on respective exclusive basic system environments and dependencies, so that different editions of the same application can run at the same time, for example, Photoshop 6.0, Photoshop 7.0 and Photoshop CS can run at the same time.

DETAILED DESCRIPTION OF THE INVENTION

To better clarify the purposes, technical solutions and advantages of the embodiments of the invention, the technical solutions of the embodiments of the invention will be clearly and completely described. Obviously, the embodiments in the following description are merely illustrative ones, and are not all possible ones of the invention. All other embodiments obtained by those ordinarily skilled in the art based on the following ones without creative labor should also fall within the protection scope of the invention.

Figure 1:
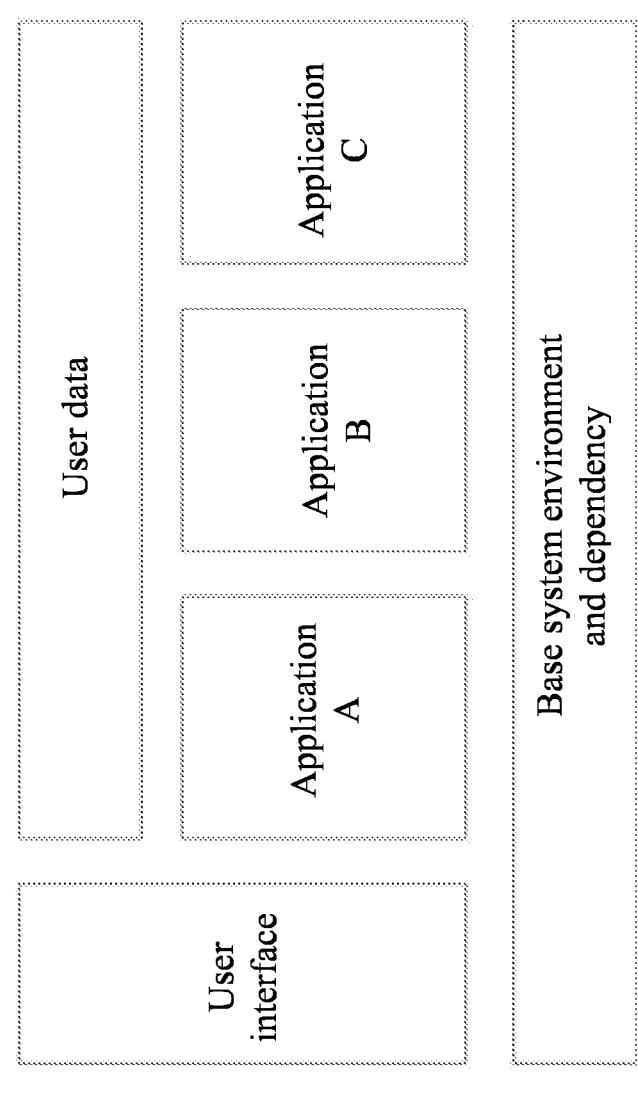
FIG. 1 is a schematic diagram of a system architecture in the description of related art.
Figure 2:
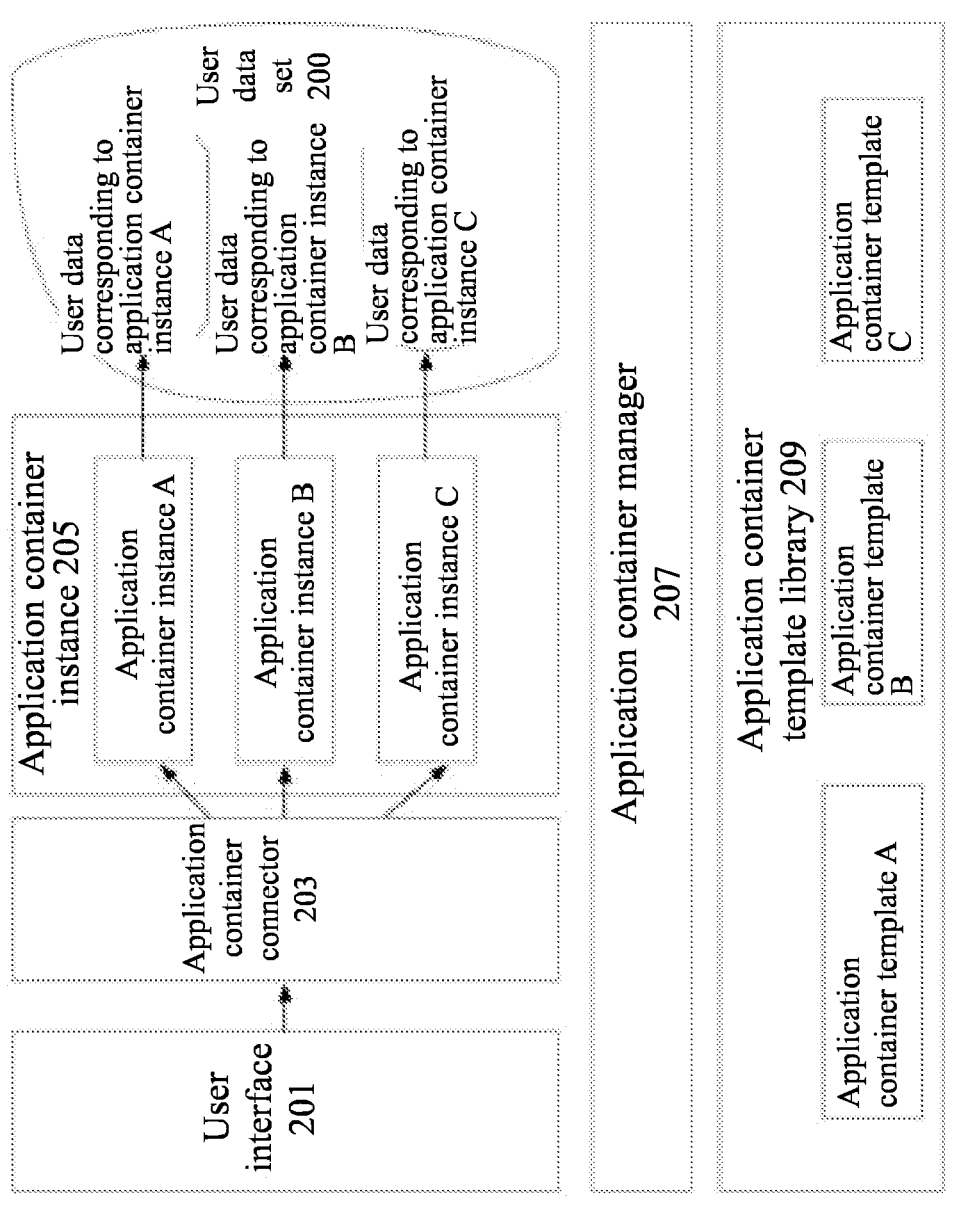
FIG. 2 is a structural diagram of an application platform according to the invention.

The invention abandons the architectural design, in the prior art, that multiple applications share one base system environment and dependency, and designs an application platform using a new system architecture. Each application container instance in the application platform of packages an application, an application connector interface, a user data interface and an exclusive base system environment and dependency for running the application, so that all applications are mutually independent, and even if one application container instance is attacked, only the attacked application container instance will be destroyed, and other application container instances can run normally without being affected. The application container instance refers to an entity unit for carrying the application and the base system environment and dependency for running the application, and may be a container formed based on a Linux namespaces isolation technique represented by Docker, or an individual physical host or virtual machine As shown in FIG. 2, the invention provides an application platform, comprising a user interface 201, an application container connector 203, at least one application container instance 205, and a user data set 200.

The user interface 201 is used for realizing direct interaction with users to transmit an interactive operation performed by the users through the user interface 201 to the application container connector 203 and obtaining feedback, matching the reactive operation, from the application container connector 203. Specifically, the user interface is a human-computer interaction interface similar to the operation interface of the Windows system, and allows users to perform operations to execute computer instructions such as starting an application.

The application container connector 203, as a bridge between the user interface 201 and the application container instance 205, accesses the application container instance 205 according to the interactive operation performed by the users through the user interface 201 (such as requesting for access to a link) and feeds contents, presented by the application container instance 205, back to the user interface 201, as a response to the interactive operation performed by the users through the user interface 201.

Figure 3:
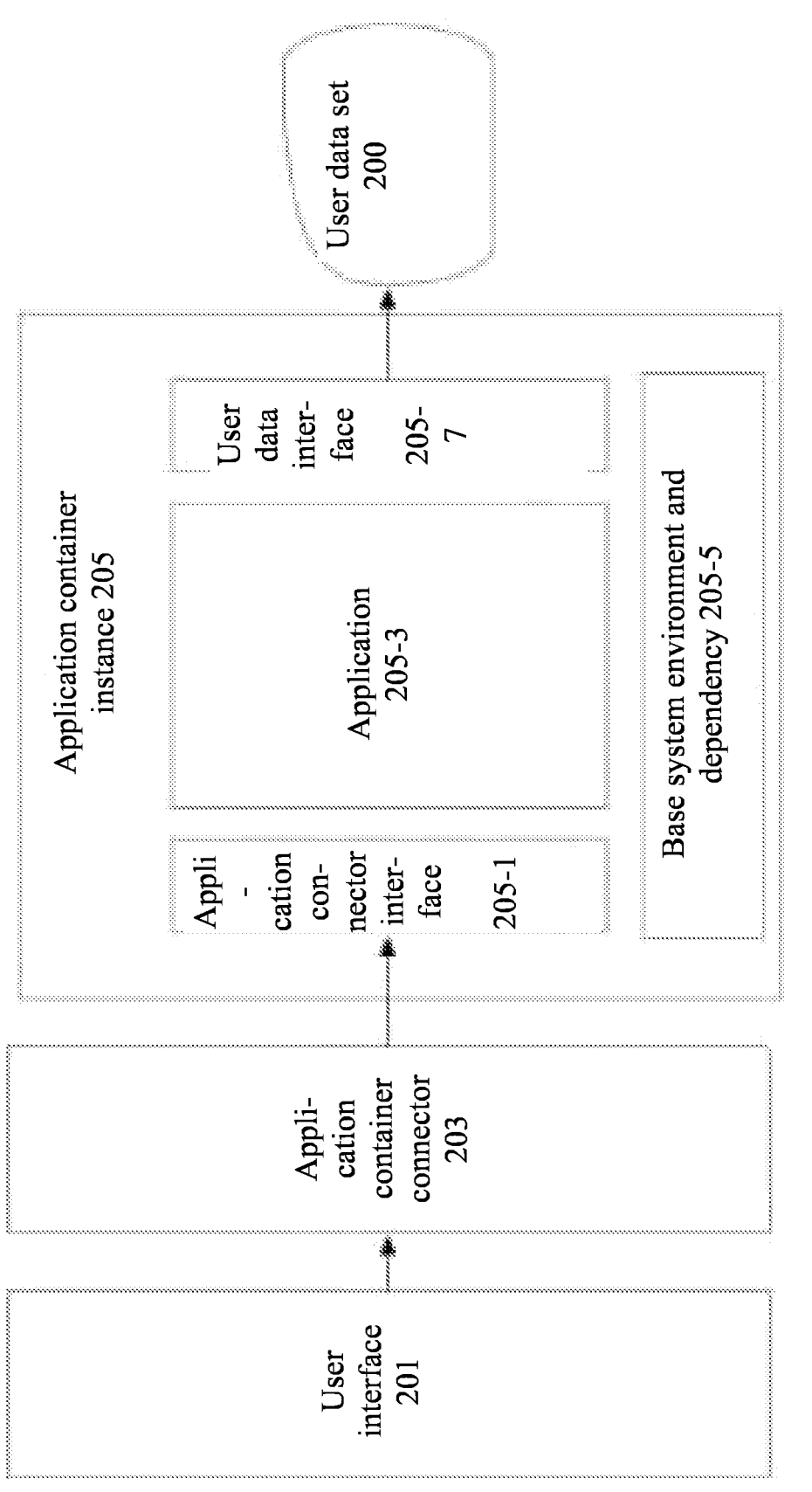
FIG. 3 is a structural diagram of an application container instance of the application platform according to the invention.

The application container instance 205, as shown in FIG. 3, comprises an application 205-3, an application connector interface 205-1 connected to the application container connector 203, a user data interface 205-7 connected to the user data set 200, and a base system environment and dependency 205-5 for running the application 205-3; the base system environment and dependency 205-5 is a basic environment and dependency exclusive to the application 205-3 and just needs to meet usage requirements of this application (a most simplified edition meeting the usage requirements of this application). For example, as for the Windows operation system, a DirectX module needs to be installed to run some games, a Chinese language package needs to be installed in a Chinese environment, a Chinese input method is needed for Chinese input, and if a notebook application in an English edition is used, none of the DirectX module, the Chinese language package and the Chinese input method is needed. In this way, the application container instance 205 will not occupy too much space; and the base system environment and dependency for the application does not need to be upgraded under the condition that the application is not upgraded, thus guaranteeing the stability of the application container instance and solving the problem that, in the prior art, a common base system environment and dependency has to be upgraded to adapt to all applications with the increase of the applications (different applications have different requirements for the base system environment and dependency) and becomes over-complicated.

After being started (the application runs automatically after the application container instance is started), the application container instance 205 receives an access from the application container connector 203 through the application connector interface 205-1, accesses user data corresponding to the application through the user data interface 207-7, and then feeds the presented contents back to the application container connector 203. The application container instance 205 may be started through the following methods: first, the application container instance 205 is started instantly after being configured by an application platform administrator, and at this moment, the application container connector 203 can directly access the application container instance 205; second, after being configured, the application container instance 205 is started according to a received start request signal (the start request signal is from the application container connector 203 or the application platform administrator), at this moment, the corresponding application container instance 205 is accessible, and then the application container connector 203 accesses the application container instance.

The user data set 200 is used for storing user data to be accessed by the application container instance 205. To better protect user data, the user data in the user data set 200 may be designed into multiple pieces of mutually independent user data by those skilled in the art, and the user data can be accessed merely by corresponding application container instances 205. That is, different application container instances can only process corresponding user data, so even if user data corresponding to one application container instance is destroyed, user data corresponding to other application container instances will not be affected, thus solving the problem that, in the prior art, data destruction and leakage may be caused because user data can be operated by all applications.

As a preferred solution of this embodiment,

The application container connector 203 is also used for transmitting the interactive operation performed by the users through the user interface 201 to the application container instance 205, and the application container instance 205 is also used for applying the interactive operation, transmitted from the application container connector 203, to the application 205-3.

As another preferred solution of this embodiment, the application platform further comprises:

An application container template library 208 storing at least one application container template;

The application container manager 207 is configured to receive a request from the application container connector 203 (such as a request for starting an application) and establish an application container instance using a corresponding application container template. Specifically, the application container manager 207 selects a corresponding application container template from the application container template library 209 according to a request from the application container connector 203, generates a corresponding application container instance according to the selected application container template (in this embodiment, the relationship between application container templates and application container instances is similar to the relationship between Docker images and Docker containers in a Docker application container engine), and starts and configures the application container instance. The at least one application container instance is configured by the application platform administrator, or is established by the application container manager 207.

The application container manager 207 is also configured to delete a corresponding application container instance according to a received application container instance removal request (for example, a user performs an operation through the user interface, and the application container connector sends an application container instance removal request to the application container manager according to the operation; or, the application platform administrator sends an application container instance removal request to the application container manager when monitoring that one application has not been operated for a long time), that is, the corresponding application container instance will be destroyed after being used by users, so that application residue is avoided, and self-restoration is realized, for example, if an application container instance is destroyed by an attack, the application container manager will delete this application container instance according to an application container instance removal request, and a new application container instance, that is not attacked or destroyed, will be established at next startup.

In this preferred solution, the application container connector 203 is also used for requesting the application container manager 207 to start a corresponding application container instance according to the interactive operation performed by the users through the user interface 201, and accessing the application container instance after the corresponding application container instance is accessible. After receiving the request, the application container manager 207 establishes the application container instance through the method mentioned above.

For the sake of a good understanding, the actual application process of the application platform of the invention will be explained by way of example:

A user performs an operation through the user interface 201 to request to start an application (such as Google Chrome, WPS or Photoshop); for example, the user double clicks a shortcut of Photoshop on the user interface to request to start the application Photoshop;

The application container connector 203 accesses an application container instance according to the interactive operation performed by the user through the user interface 201 (the application container instance is configured by the application platform administrator or is established by the application container manager, and is started according to a request from the application container connector); in this example, the application container instance comprises the application Photoshop, an application connector interface connected to the application container connector, a user data interface connected to the user data set, and a base system environment and dependency for running the application Photoshop; after being started, the application container instance 205 receives an access from the application container connector 203 through the application connector interface 205-1, accesses user data corresponding to the application through the user data interface 205-7, and then feeds, presented contents, back to the application container connector 203; and the application container connector 203 feeds the contents, presented by the application container instance 205, back to the user interface 201, as a response to the request for starting an application container instance initiated by the user through the user interface 201.

In a case where an application container instance corresponding to the application requested to be started by the user is neither configured by the application platform administrator nor established by the application container manager 207, the application container connector 203 requests the application container manager 207 to start a corresponding application container instance according to the interactive operation performed by the user through the user interface 201. For example, the application container connector 203 checks, according to the interactive operation performed by the user through the user interface 201, whether the application platform has configured the application container instance corresponding to the application requested to be started by the user; if not, the application container connector 203 requests the application container manager 207 to start the corresponding application container instance;

The application container manager 207 receives the request from the application container connector 203, selects a corresponding application container template from the application container template library 209, generates a corresponding application container instance according to the selected application container template, and starts and configures the application container instance, and the application container manager 207 transmits information, indicating that the application container instance has been started and configured, to the application container connector 203;

When receiving the information indicating that the application container instance has been started and configured, the application container connector 203 accesses the application container instance;

The application container instance 205 receives an access from the application container connector 203 through the application connector interface 205-1, accesses user data corresponding to the application through the user data interface 205-7, and then feeds presented contents back to the application container connector 203, and the application container connector 203 feeds the contents, presented by the application container instance, back to the user interface 201, as a response to the request for starting an application container instance initiated by the user through the user interface 201.

The invention further provides another application platform, comprising a user interface 201, an application container connector 203, an application container manager 207, and a user data set 200.

The user interface 201 is used for realizing direct interaction with users to transmit an interactive operation performed by the users through the user interface 201 to the application container connector 203 and obtaining feedback, matching the interactive operation, from the application container connector 203. Specifically, the user interface is a human-computer interaction interface similar to the operation interface of the Windows system, and allows users to perform operations to execute computer instructions such as starting an application.

On one hand, the application container connector 203 requests the application container manager 207 to start a corresponding application container instance according to the interactive operation performed by the user through the user interface 201 (for example, the users request for starting an application or accessing a link) and accesses the application container instance after the corresponding application container instance is assessable; and on the other hand, the application container connector 203 feeds contents, presented by the application container instance 205, back to the user interface 201, as a response to the request for starting an application container instance initiated by the user through the user interface.

The application container manager 207 is configured to receive the request from the application container connector 203 (such as a request for starting an application) and establish an application container instance using a corresponding application container template. Specifically, the application container manager 207 selects a corresponding application container template from an application container template library 209 according to the request from the application container connector 203 and generates a corresponding application container instance according to the selected application container template (in this embodiment, the relationship between application container templates and application container instances is similar to the relationship between Docker images and Docker containers in a Docker application container engine), and starts and configures the application container instance.

As shown in FIG. 3, the application container instance 205 comprises an application 205-3, an application connector interface 205-1 connected to the application container connector 203, a user data interface 205-7 connected to the user data set 200, and a base system environment and dependency for running the application 205-3; the base system environment and dependency 205-5 is a basic environment and dependency exclusive to the application 205-3 and just needs to meet usage requirements of this application (a most simplified edition meeting the usage requirements of this application). For example, as for the Windows operation system, a DirectX module needs to be installed to run some games, a Chinese language package needs to be installed in a Chinese environment, a Chinese input method is needed for Chinese input, and if a notebook application in an English edition is used, none of the DirectX module, the Chinese language package and the Chinese input method is needed. In this way, the application container instance 205 will not occupy too much space; and the base system environment and dependency for the application does not need to be upgraded under the condition that the application is not upgraded, thus guaranteeing the stability of the application container instance and solving the problem that, in the prior art, a common base system environment and dependency has to be upgraded to adapt to all applications with the increase of the applications (different applications have different requirements for the base system environment and dependency) and becomes over-complicated. After being started (the application run automatically after the application container instance is started), the application container instance 205 receives an access from the application container connector 203 through the application connector interface 205-1, accesses user data corresponding to the application through the user data interface 205-7, and then feed presented contents back to the application container connector 203.

The user data set 200 is used for storing user data to be accessed by the application container instance 205. To better protect user data, the user data in the user data set 200 may be designed into multiple pieces of independent user data by those skilled in the art, and the user data can be accessed merely by corresponding application container instances 205. That is, different application container instances can only process corresponding user data, so even if user data corresponding to one application container instance is destroyed, user data corresponding to other application container instances will not be affected, thus solving the problem that, in the prior art, data destruction and leakage may be caused because user data can be operated by all applications.

As a preferred solution of this embodiment,

The application container connector 203 is also used for transmitting the interactive operation performed by the users through the user interface 201 to the application container instance 205, and the application container instance 205 is also used for applying the interactive operation, transmitted from the application container connector 203, to the application 205-3.

As another preferred solution of this embodiment, application container manager 207 is also configured to delete a corresponding application container instance according to a received application container instance removal request (for example, a user performs an operation through the user interface, and the application container connector sends an application container instance removal request to the application container manager according to the operation; or, an application platform administrator sends an application container instance removal request to the application container manager when monitoring that one application has not been operated for a long time), that is, the corresponding application container instance will be destroyed after being used by users, so that application residue is avoided, and self-restoration is realized, for example, if an application container instance is destroyed by an attack, the application container manager will delete this application container instance according to an application container instance removal request, and a new application container instance, that is not attacked or destroyed, will be established at next startup.

For the sake of a good understanding, the actual application process of the application platform of the invention will be explained by way of example:

A user performs an operation through the user interface 201 to request to start an application (such as Google Chrome, WPS or Photoshop); for example, the user double clicks a shortcut of Google Chrome on the user interface to request to start the application Google Chrome;

The application container connector 203 requests the application container manager 207 to start a corresponding application container instance 205 according to the interactive operation performed by the user through the user interface 201;

The application container manager 207 receives the request from the application container connector 203, selects a corresponding application container template from the application container template, generates a corresponding application container instance according to the selected application container template, and starts and configures the application container instance. In this example, the application container instance comprises the application Google Chrome, an application connector interface connected to the application container connector, a user data interface connected to the user data set, and a base system environment and dependency for running the application Google Chrome; after the application container instance 205 is started, the application container manager 207 sends information, indicating that the application container instance has been started and configured, to the application container connector 203;

The application container connector 203 accesses the application container instance after receiving the information indicating that the application container instance has been started and configured;

The application container instance 205 receives an access from the application container connector 203 through the application connector interface 205-1, accesses user data corresponding to the application through the user data interface 205-7, and then feeds presented contents back to the application container connector 203;

The application container connector 203 feeds the contents, presented by the application container instance 205, back to the user interface 201, as a response to the request for starting an application container instance initiated by the user through the user interface 201.

The invention further provides an application management method applied to an application container manager 207, comprising:

A request for starting an application container instance from an application container connector 203, such as a request for starting an application or a request for accessing a link (essentially a request for starting an explorer application) is received; and An application container instance is generated using a corresponding application container template; specifically, the application container manager 207 selects a corresponding application container template from an application container template library 209 according to the request from the application container connector 203, generates a corresponding application container instance according to the selected application container template, (in this embodiment, the relationship between application container templates and application container instances is similar to the relationship between Docker images and Docker containers in a Docker application container engine), and starts and configures the application container instance;

Wherein, the application container instance 205 comprises:

An application 205-3;

An application connector interface 205-1 connected to the application container connector 203 to feed contents, presented by the application 205-3, back to a user interface 201 through the application container connector 203;

A user data interface 205-7 connected to a user data set 200 to allow the application 205-3 to access user data corresponding to the application; and A base system environment and dependency 205-5 for running the application.

As a preferred solution of this embodiment, the method further comprises:

A corresponding application container instance is deleted according to a received application container instance removal request (for example, an application platform administrator sends an application container instance removal request to the application container manager when monitoring that one application container instance has not been used for a long time), that is, the corresponding application container instance will be destroyed after being used by users, so application residue is avoided, and self-restoration is realized, for example, if an application container instance is destroyed by an attack, the application container manager will delete this application container instance according to an application container instance removal request, and a new application container instance, that is not attacked or destroyed, will be established at next startup.

Figure 4:
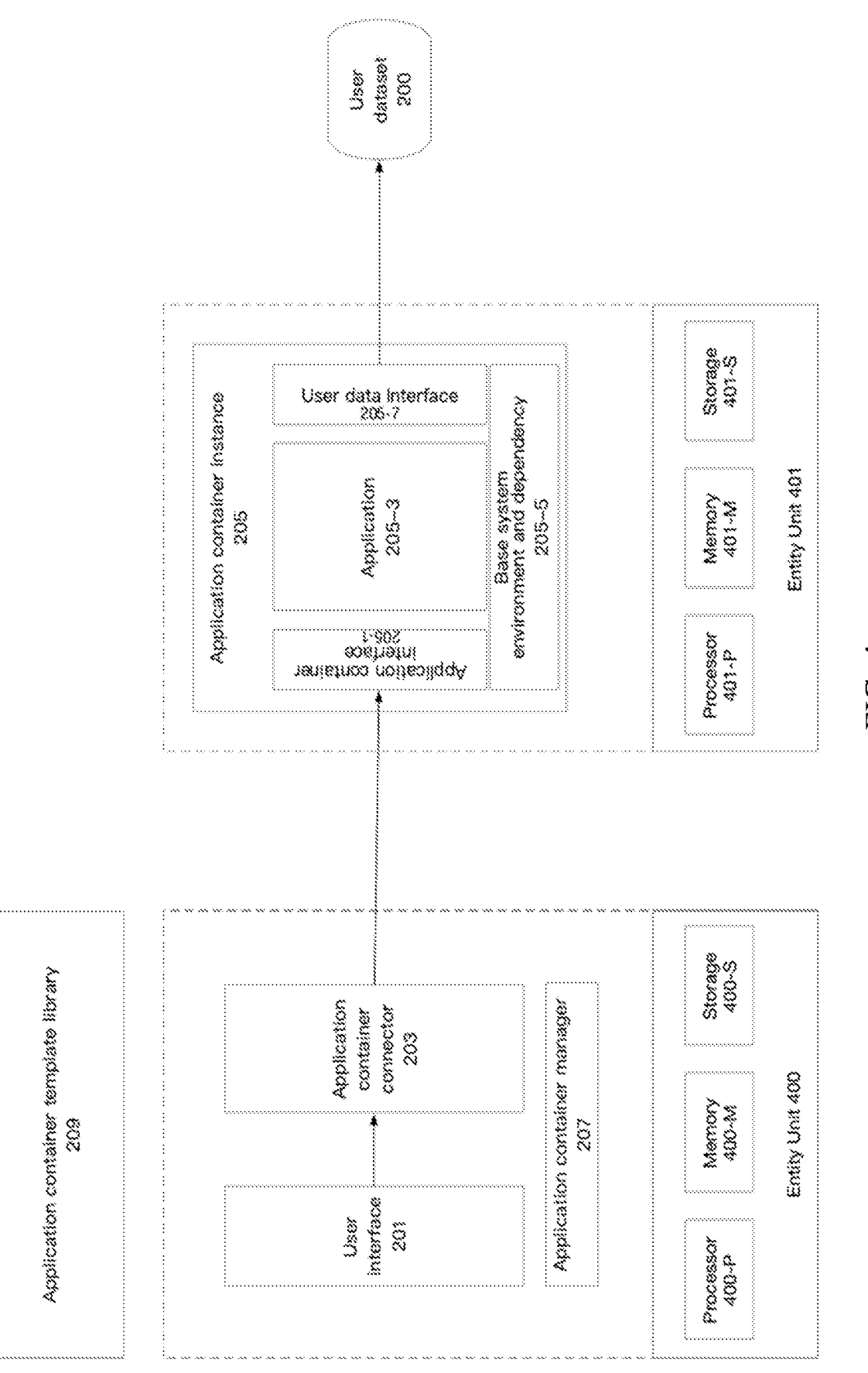
FIG. 4 is a structural diagram of an embodiment of an application container instance of the application platform according to the invention.

In some embodiments of the invention, one of which is shown in FIG. 4, Entity Unit 400 comprises Memory 400-M storing instructions and Processor 400-P to execute the instructions to realize interaction with users using user interface 201 and access application container instance 205 using an application container connector 203 according to an interactive operation performed by the users through the user interface 201, and another entity unit, Entity Unit 401, comprises Memory 401-M storing instructions and Processor 401-P to execute the instructions to start the application container instance 205, and store user data using the user dataset 200 to be accessed by the application container instance 205.

In FIG. 4, Memory 400-M also stores instructions and Processor 400-P to execute the instructions to receive requests from the application container connector 203, request the application container manager 207 to establish an application container instance 205 using a corresponding application container template stored in application container template library 209 and delete an application container instance when needed.

The application container template library 209 and user dataset 200 may be partially, completely or with replicas stored in Storage 400-S with Entity Unit 400, Storage 401-S with Entity Unit 401, or any network location that is accessible from Entity Unit 400 or Entity Unit 401. User dataset 200 may exist independently, be located in Storage 400-S in Entity Unit 400 or Storage 401-S in Entity Unit 401, or be located in whole or in part in both Storage 400-S in Entity Unit 400 and Storage 401-S in Entity Unit 401.

In different variations of embodiment shown in FIG. 4, one or more of user interface 201, application container connector 203 and application container manager 207, all hosted on Entity Unit 400, may be partially, completely, or with a replica hosted on Entity Unit 401, to reduce workload on Entity Unit 400 as well as improving stability and reliability of the system.

Figure 5:
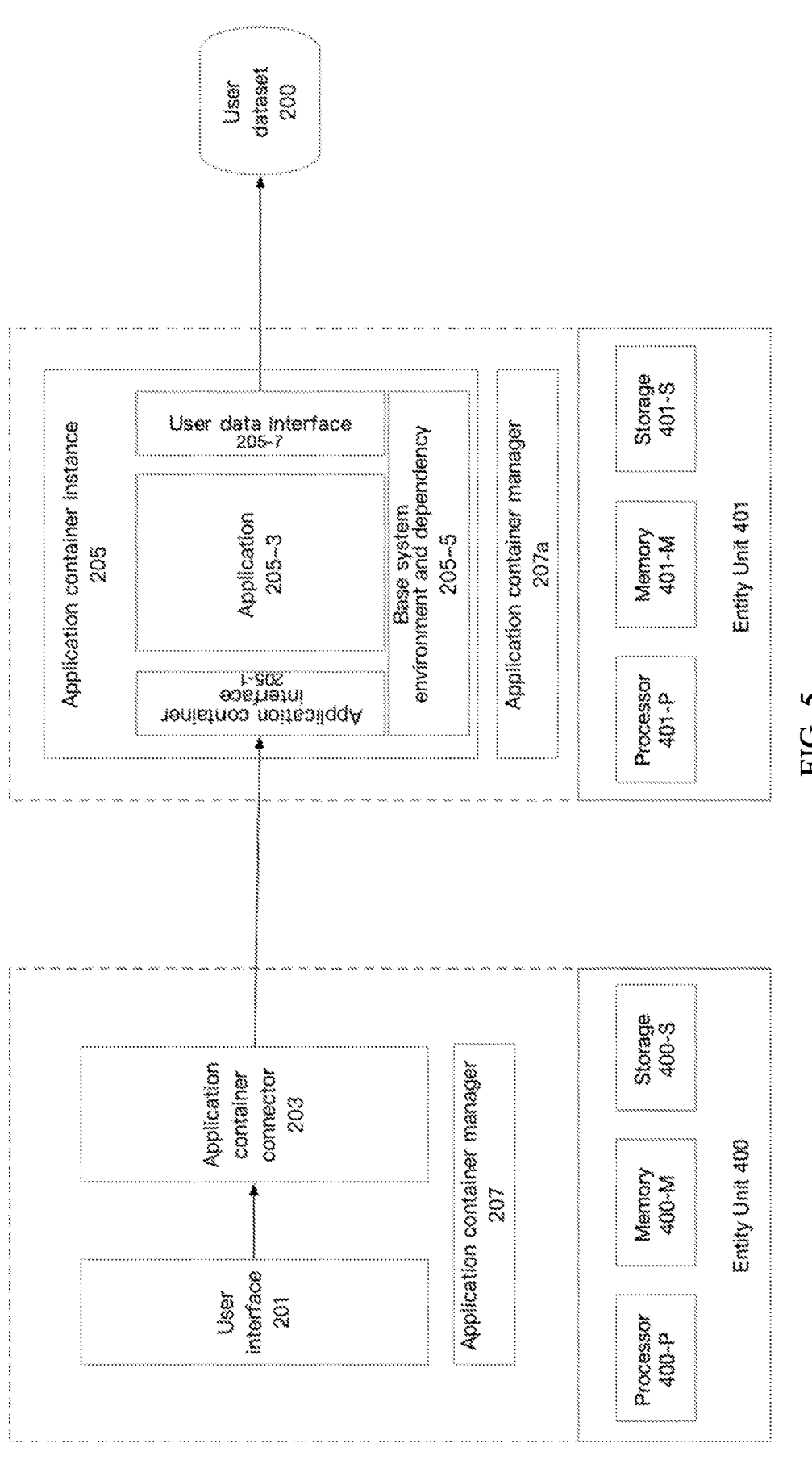
FIG. 5 is a structural diagram of another embodiment of an application container instance of the application platform according to the invention.

FIG. 5 is a structural diagram of another embodiment of an application container instance of the application platform according to the invention. In this embodiment, the Entity Unit 401 is implemented with an application container manager 207a that a subset, a superset, or a replica of the functionalities of the application container manager 207 in Entity Unit 400 is hosted on the Entity Unit 401. Herein, a subset contains some but not all of the functionalities of the reference application container manager; a superset contains all the functionalities of the reference application container manager plus more functionalities; and a replica contains exactly the same functionalities of the reference application container manager. In other words, the application container manager 207 of the Entity Unit 400 may be partially, completely, or with a replica hosted on Entity Unit 401.

The examples in the above implementations are used to assist in further understanding the solutions of the invention rather than limiting the technical solutions of the invention. Although the invention has been described in detail with reference to the above embodiments, those ordinarily skilled in the art would appreciate that amendments to the technical solutions of the above embodiments or equivalent substitutions to part of the technical features in the above embodiments can be made without making the essence of corresponding technical solutions depart from the scope of technical solutions of the embodiments of the invention.

What is claimed is:

1. A system comprising: an application platform on a network device, comprising: a memory storing instructions, and at least one hardware processor to execute the instructions to:

realize interaction with users using a user interface;

start, using an application container manager, a corresponding application container instance according to an interactive operation performed by the users through the user interface;

access an application container instance using an application container connector according to an interactive operation performed by the users through the user interface;

the system further comprising: an entity unit, comprising: a further memory storing instructions, and at least one further hardware processor to execute the instructions to:

run the application container instance, which comprises an application, an application connector interface connected to the application container connector, a user data interface connected to an external user data set, and a base system environment and dependency for running the application, wherein after being started, the application container instance receives an access from the application container connector through the application connector interface and accesses user data corresponding to the application through the user data interface; and store user data using the user data set to be accessed by the application container instance;

an application container template library storing at least one application container template; and an application container manager configured for receiving a request from the application container connector and establishing an application container instance using a corresponding application container template;

wherein: the application container manager is further configured for, for establishing an application container instance using a corresponding application container template, selecting the corresponding application container template from the application container template library by the application container manager according to the request from the application container connector, generating a corresponding application container instance according to the selected application container template, and starting and configuring the application container instance; and wherein: the application container connector is further configured for requesting the application container manager to start a corresponding application container instance according to the interactive operation performed by the users through the user interface, and accessing the application container instance after the corresponding application container instance is accessible.

2. The system according to claim 1, wherein: the application container connector is further configured for feeding contents, presented by the application container instance, back to the user interface; and the application container instance is configured for feeding the presented contents back to the application container connector.

3. The system according to claim 1, wherein: the application container connector is further configured for transmitting the interactive operation performed by the users through the user interface to the application container instance; and the application container instance is further configured for applying the interactive operation transmitted from the application container connector to the application.

4. The system according to claim 1, wherein: the application container manager is further configured for deleting an application container instance.

5. The system according to claim 1, wherein: the user data set stores multiple pieces of mutually independent user data that is to be accessed merely by corresponding application container instances.

6. The system according to claim 1, wherein: the application container instance is established by the application container manager in claim 1 according to the request from the application container connector.

7. A system, comprising: an application platform on a network device, comprising: a memory storing instructions; and at least one hardware processor to execute the instructions to:

realize interaction with users using a user interface;

request an application container manager to start a corresponding application container instance using an application container connector according to an interactive operation performed by the users through the user interface, and access the application container instance after the corresponding application container instance is accessible;

receive a request using the application container manager from the application container connector and establish the application container instance using a corresponding application container template;

the system further comprising: an entity unit, comprising: a further memory storing instructions; and at least one further hardware processor to execute the instructions to:

run the application container instance, wherein, the application container instance comprises an application, an application connector interface connected to the application container connector, a user data interface connected to an external user data set, and a base system environment and dependency for running the application; and after being started, the application container instance receives an access from the application container connector through the application connector interface and accesses user data corresponding to the application through the user data interface; store user data using the user data set to be accessed by the application container instance;

an application container template library storing at least one application container template; and an application container manager configured for receiving a request from the application container connector and establishing an application container instance using a corresponding application container template;

wherein: the application container connector is further configured for requesting the application container manager to start a corresponding application container instance according to the interactive operation performed by the users through the user interface, and accessing the application container instance after the corresponding application container instance is accessible; and wherein: the application container manager is further configured for, for establishing an application container instance using a corresponding application container template: selecting the corresponding application container template from an application container template library by the application container manager according to the request from the application container connector, generating the corresponding application container instance according to the selected application container template, and starting and configuring the application container instance.

8. The system according to claim 7, wherein: the application container connector is further configured for feeding contents, presented by the application container instance, back to the user interface; and the application container instance is configured for feeding the presented contents back to the application container connector.

9. The system according to claim 7, wherein: the application container connector is further configured for transmitting the interactive operation performed by the users through the user interface to the application container instance; and the application container instance is further configured for applying the interactive operation transmitted from the application container connector to the application.

10. The system according to claim 7, wherein: the application container manager is further configured for deleting an application container instance.

11. The system according to claim 7, wherein: the user data set stores multiple pieces of mutually independent user data that is to be accessed merely by corresponding application container instances.

* * * * *